United States Patent [19]

Cutler et al.

[11] 3,860,953

[45] Jan. 14, 1975

[54] METHOD AND APPARATUS FOR ENCODING COLOR VIDEO SIGNALS

[75] Inventors: Cassius Chapin Cutler, Holmdel; John Ormond Limb, New Shrewsbury; Charles Benjamin Rubinstein, Colts Neck, all of N.J.

[73] Assignee: Bell Telephone Laboratories, Incorporated, Murray HIll, N.J.

[22] Filed: June 26, 1973

[21] Appl. No.: 373,634

[52] U.S. Cl. .................................................. 358/13
[51] Int. Cl. ...................................................... H04n
[58] Field of Search .......... 178/5.2 R, 5.4 R; 358/13

[56] References Cited

UNITED STATES PATENTS 3,773,971 11/1973 Sainte-Beuve .................. 178/5.4 R

*Primary Examiner*—Richard Murray
*Attorney, Agent, or Firm*—Daniel D. Dubosky

[57] ABSTRACT

The luminance and two chrominance signals in a color video system are translated into digital words by a plurality of analog-to-digital encoders. The difference between adjacent luminance words is compared against a threshold level in a luminance decision circuit. When the difference exceeds the threshold level, a first energizing signal is developed. The chrominance samples are averaged in a chrominance processing circuit. Each chrominance sample is compared with its corresponding average value to develop a chrominance error signal. Summations of the chrominance error signals are checked in a chrominance decision circuit in order to determine if a significant change has occurred in the chrominance signal. If such a change has occurred, a second energizing signal is developed. In response to the development of either a first or a second energizing signal, the average value for each of the two chrominance signals is coupled to a transmission channel and the chrominance processing circuit is reset in preparation for the development of a new average. When the second energizing signal is developed in the absence of a first energizing signal, the values of adjacent luminance words are modified by equal increments of opposite polarity before these luminance words are coupled to the transmission channel.

13 Claims, 3 Drawing Figures

METHOD AND APPARATUS FOR ENCODING COLOR VIDEO SIGNALS

BACKGROUND OF THE INVENTION

This invention relates to video signal processing circuits and, more particularly, to a digital processing circuit for use with the chrominance signals that are developed in a color video system.

In a copending application by J. O. Limb and C. B. Rubinstein entitled "Method and Apparatus for Encoding Color Video Signals," filed Jan. 26, 1973, Ser. No. 325,603, a color signal video encoder is described in which color information is transmitted to a receiving location only when the difference between adjacent luminance samples is found to exceed a threshold level. The chrominance samples from each of two chrominance signals are added together in an accumulator circuit and divided by the number of sammples in order to develop average values for each of the two chrominance signals. When the difference between adjacent luminance samples is determined to exceed the threshold level, the average value for each of the two chrominance signals is coupled into a buffer memory and the averaging apparatus is reset to zero in preparation for the development of a new average. These average values in the buffer memory are coupled to the transmission channel during the horizontal blanking interval. Inasmuch as the receiving decoder can detect significant differences between adjacent luminance samples, no addressing information need accompany the chrominance average values. The decoder simply utilizes an appropriate average value to represent each chrominance signal between adjacent significant differences in the luminance signal.

In order to be certain that all of the chrominance changes are transmitted in the apparatus described in the above-mentioned copending application, the threshold level in the luminance decision circuit is maintained at a level low enough such that more chrominance information is transmitted to the receiving decoder than is thought to be absolutely necessary. In addition, a few rare instances have been uncovered in which a chrominance change can take place with virtually no change appearing in the luminance signal.

SUMMARY OF THE INVENTION

A primary object of the present invention is to further decrease the number of bits which must be utilized to transmit color information in a color video system.

A further object of the present invention is to improve the accuracy of the color signals developed by the decoder by insuring that even the chrominance changes which occur during no luminance change are transmitted to the decoder.

These and other objects are achieved in accordance with the present invention wherein adjacent luminance samples are compared in a luminance decision circuit against a threshold level in order to develop a first energizing signal. The chrominance samples from a chrominance signal are utilized in a chrominance processing apparatus in order to develop a representative value for the chrominance signal. Each chrominance sample is compared with the representative value to develop a chrominance error signal. Summations of the chrominance error signals are checked in a chrominance decision circuit and a second energizing signal is developed by this circuit when the summations of the chrominance error signals are determined to exceed other predetermined threshold levels. In response to either a first energizing signal from the luminance decision circuit or a second energizing signal from the chrominance decision circuit, the representative value from the chrominance signal processing apparatus is coupled into a buffer memory prior to being transmitted, and the chrominance signal processing apparatus is reset in order to permit the development of a new representative value. In response to the presence of a second energizing signal from the chrominance decision circuit during an instant when there is no first energizing signal present at the output from the luminance decision circuit, the values of adjacent luminance samples are modified in accordance with a predetermined characteristic by an amount which will insure a difference between their values in excess of the threshold level present in the luminance decision circuit. As a result, the chrominance information can be transmitted by utilizing fewer digital bits since the threshold level in the luminance decision circuit may be raised to the point where this decision circuit will only produce a first energiziing signal when it is virtually certain that a change in the chrominance signal has occurred. The other chrominance changes are picked up by the chrominance decision circuit and the decoder is informed of their location in the video line by the presence of the artificially generated change in the adjacent luminance values.

In the specific embodiment shown to illustrate the utility of the present invention, the representative value which is generated by the chrominance signal processing apparatus is simply an average value for each of the chrominance signals. In addition, the luminance signal is modified in the present embodiment by a waveform known to those skilled in the art as a doublet. This particular shape of waveform modifies the luminance signal by changing adjacent luminance samples by equal increments of opposite polarity. As a result of this choice in waveform, the change induced into the luminance signal is subjectively not annoying due to the integrating effect of the eye.

BRIEF DESCRIPTION OF THE DRAWINGS

The invention will be more readily understood after reading the following detailed description taken in conjunction with the drawings in which.

DETAILED DESCRIPTION

Figure 1:
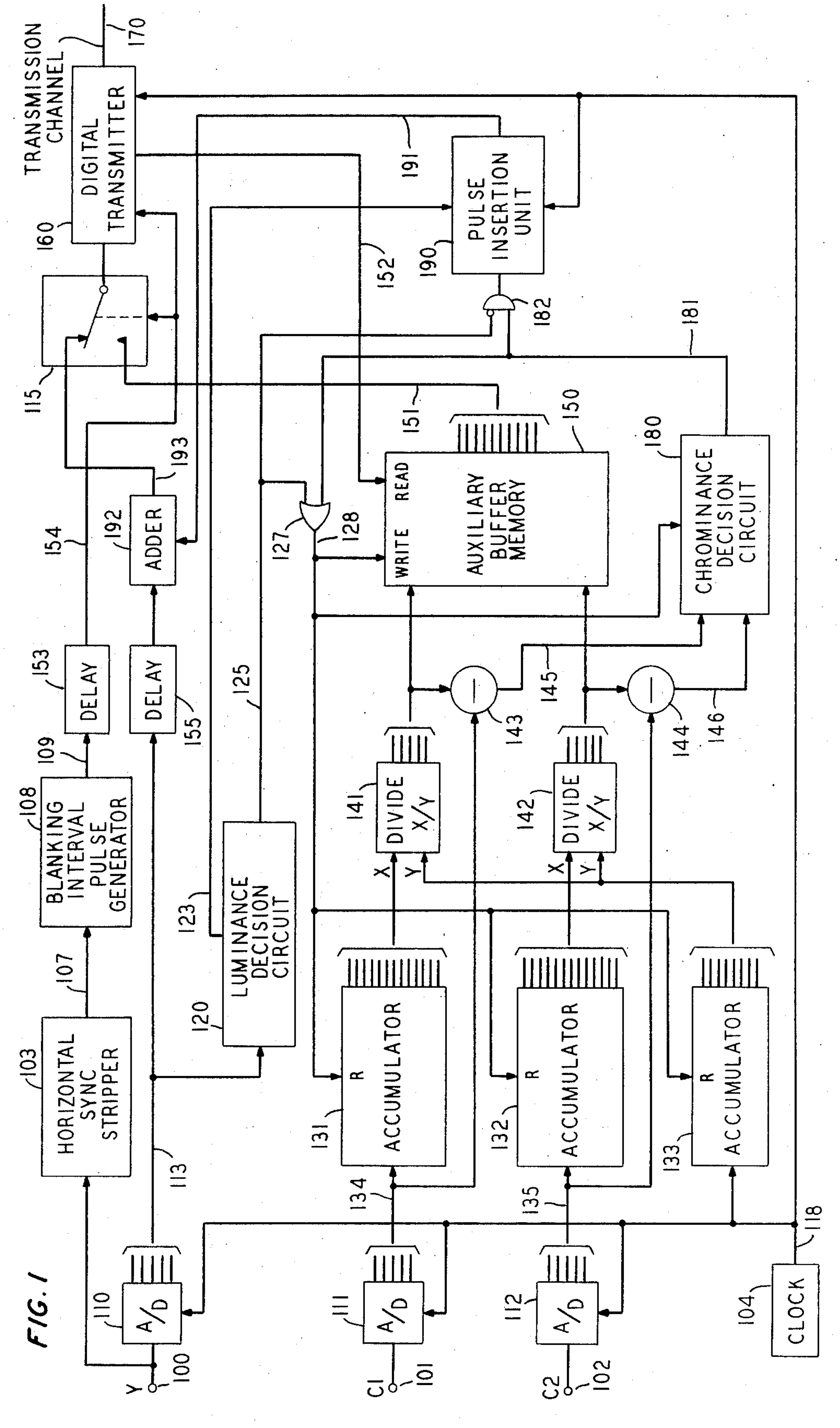
FIG. 1 is a schematic block diagram of a digital encoder constructed in accordance with the present invention.

In FIG. 1, the luminance and two baseband chrominance signals of the type generated in an NTSC video system are coupled to input terminals 100, 101 and 102. The luminance signal at terminal 100 is coupled both to the input of an analog-to-digital encoder 110 and to the input of a horizontal sync stripper 103. The chrominance signal at input terminal 101 and the chrominance signal at input terminal 102 are coupled to the inputs of analog-to-digital converters 111 and 112, respectively. A clock generator 104 provides energizing pulses on line 118 to the control inputs of each of the analog-to-digital converters 110, 111 and 112. In response to a pulse from clock generator 104, each of the analog-to-digital converters samples the analog signal provided at its input and develops a digital word at its output the value of which represents the amplitude of the sample. The pulses from clock generator 104 occur at a sufficiently rapid rate such that digital words are produced at the output of analog-to-digital converter 110 for each of the picture elements within a video line.

In a video telephone system where the bandwidth is in the order of one megahertz, a pulse rate of two megahertz is provided by clock generator 104. These pulses from generator 104 also cause analog-to-digital converters 111 and 112 to develop digital words at their respective outputs which represent the sampled amplitudes of their respective chrominance signals. The rate at which these chrominance digital words are developed can be much reduced in view of the lower frequency content in the chrominance signals but, as will be appreciated by those skilled in the art after a more thorough understanding of the present invention, this reduction in pulse rate is not necessary since all of the digital information developed by converters 111 and 112 is not coupled through to the transmission channel.

Figure 2:
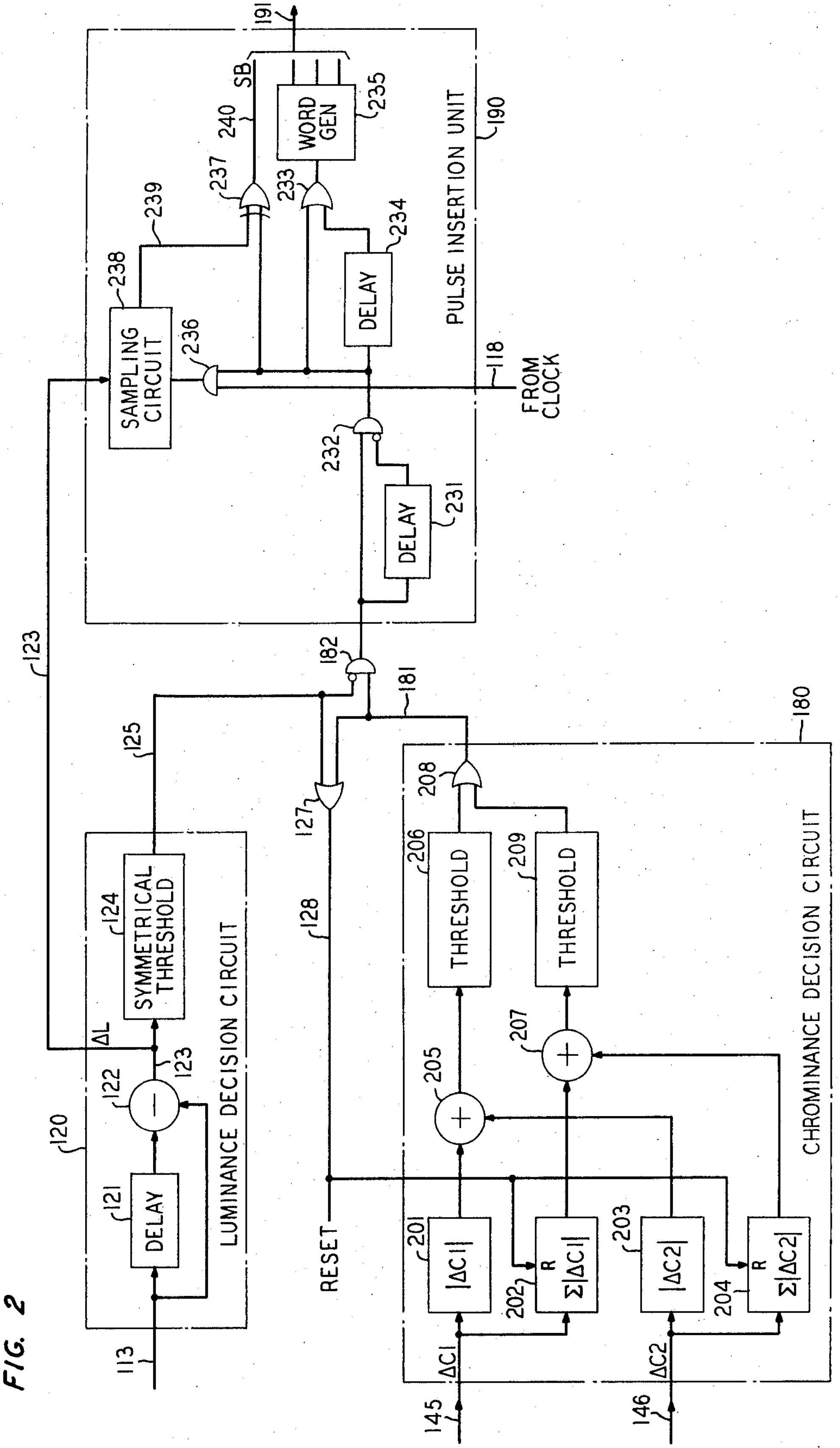
FIG. 2 is a more detailed schematic block diagram of several of the elements shown as blocks in FIG. 1.

Each digital word developed by the analog-to-digital converter 110 is coupled to the input of a luminance decision circuit 120. A detailed schematic block diagram of the decision circuit 120 is shown in FIG. 2. In FIG. 2, the digital words from bus 113 are coupled both to the input of a delay memory 121 and also to one input of a subtraction circuit 122. Delay memory 121 provides each of the digital words at its input with a one element delay, that is, with a delay equal to the interval between successive digital words on bus 113. The output of delay memory 121 is coupled to a second input of subtraction circuit 122. Hence, subtraction circuit 122 establishes at its output on line 123 a digital word, the value of which represents the amplitude of the difference between successive digital words on bus 113. This difference between adjacent luminance values in the video line is designated as ΔL in FIG. 2.

The difference on line 123 is coupled to the input of a symmetrical threshold circuit 124. If the absolute magnitude of the difference on line 123 is less than the predetermined threshold level, threshold circuit 124 produces a logic "0" level output on line 125. If, however, the absolute magnitude of the difference on line 123 exceeds the predetermined threshold level, threshold circuit 124 produces a logic "1" level energizing pulse on line 125. In the present embodiment, where the luminance values are represented by eight bits on bus 113, thereby corresponding to 256 levels of luminance information, the threshold level in threshold circuit 124 is caused to be equal to eight. Other threshold levels may also be utilized and the particular threshold level which is chosen depends primarily on the statistics of the video images normally transmitted by way of the encoder. In summary, decision circuit 120 produces an element-to-element luminance difference value, ΔL, on line 123 and an energizing pulse one line 125 in response to a change in the luminance signal which exceeds a predetermined threshold level.

In FIG. 1, the outputs of analog-to-digital converter 111 and analog-to-digital converter 112 are each coupled to the inputs of accumulator circuit 131 and accumulator circuit 132 by way of buses 134 and 135, respectively. In response to each digital word presented at their inputs, accumulator circuits 131 and 132 add the value represented by the digital word to an internally-developed summation. This summation within each of the accumulator circuits 131 and 132 is available at the output of each of the accumulator circuits. In the present embodiment, where the values for the chrominance samples are provided by 5-bit digital words, each of the accumulator circuits is caused to have an output of 13 digital bits. This permits the summation of 256 chrominance values, thereby permitting a significant luminance change in each of the 256 picture elements in a video line. As will be appreciated by those skilled in the art, this number of changes in luminance information is extremely unlikely and further experimentation with the type of pictures intended to be transmitted may easily result in a reduction in the number of bits which must be provided by each of the accumulator circuits.

Each of the accumulator circuits also has a reset input which when energized causes the internal summation within the accumulator circuit to be cleared to zero. The 13-bit digital word representing the summation within each of the accumulator circuits 131 and 132 is coupled to one input of a divider circuit 141 and a divider circuit 142, respectively.

The pulses from clock generator 104, in addition to being coupled to the analog-to-digital converters, are also coupled to the input of an accumulator circuit 133. Accumulator circuit 133, like the other two accumulator circuits, has a reset input which when energized causes its internal summation to be cleared to zero. The output of accumulator circuit 133 is connected to the second input of each of the divider circuits 141 and 142. Accordingly, each of the divider circuits by being presented with the summation from its respective accumulator circuit at one input, and a number from accumulator circuit 133 at its other input representing the number of samples utilized to develop that summation, provides at its output an average value for its respective chrominance signal.

The reset inputs for accumulator circuits 131, 132 and 133 are all coupled by way of line 128 to the output of OR gate 127 one input of which is connected to line 125, the output of luminance decision circuit 120. In addition, line 128 is coupled to the write input of an auxiliary buffer memory 150. Hence, in response to each energizing pulse on line 125, the average values present at the outputs of divider circuits 141 and 142 are coupled into storage within memory 150 and the accumulator circuits 131, 132 and 133 are all reset to zero. In the present embodiment, wherein 256 picture elements are present during the active region of the video line and the horizontal blanking interval corresponds to an interval equal to 44 picture elements, auxiliary buffer memory 150 is made large enough to store 35 10-bit digital words each of which represents two 5-bit digital words, one for each of the two chrominance signals. This capacity is believed to be large enough to process color signals of the type generated in a video-telephone service. The capacity of buffer memory 150, however, may be increased to store more than the 35 10-bit digital words since information may be transmitted during the vertical blanking interval during which most encoders do not generate additional luminance or chrominance information. If it is determined that even this vertical blanking interval is not sufficient to accommodate the amount of information being generated, the threshold level may be increased within threshold circuit 124 or this threshold level may be caused to vary as a function of the amount of information being stored within a buffer memory of the digital transmitter.

The operation of the apparatus described thus far is identical to the operation of the encoder disclosed in the above-mentioned copending application by Messrs. J. O. Limb and C. B. Rubinstein. In accordance with the present invention, the representative value for each of the chrominance signals is coupled into the buffer memory 150 not only in response to changes in the luminance signal but also in response to changes in either one or both of the chrominance signals. In the embodiment shown in FIG. 1, each of the digital words on buses 134 and 135 representing amplitude values of the chrominance signals is coupled to one input of each of two subtractor circuits 143 and 144, respectively. A second input of each of the subtractor circuits 143 and 144 is coupled to the output of its corresponding divider circuit 141 or 142. As a result, subtractor circuits 143 and 144 each provide at their outputs a digital word whose value indicates the difference between the present value of its corresponding chrominance signal and the average value which will represent that chrominance signal. These differences from subtractor circuits 143 and 144 are coupled by way of lines 145 and 146 into a chrominance decision circuit 180. If these differences are determined to exceed the threshold levels within chrominance decision circuit 180, the latter circuit develops an energizing signal on line 181 at a second input of OR gate 127. This energizing signal from chrominance decision circuit 180, like the energizing signal from the luminance decision circuit 120, causes the average digital words from divider circuits 141 and 142 to be coupled into buffer memory 150 and, furthermore, causes the accumulator circuits 131, 132 and 133 to be reset to zero.

A schematic block diagram of apparatus utilized to implement the chrominance decision circuit 180 is shown in FIG. 2. In FIG. 2, the difference digital words on lines 145 and 146 are each coupled to the inputs of circuits 201 and 203, respectively. Each of these circuits, 201 and 203, develops the absolute magnitude of the difference signal presented to its respective input and couples this absolute magnitude to one input of an addition circuit 205. As a result, the absolute magnitude of the difference signal on line 145 and the absolute magnitude of the difference signal on line 146 are added together in addition circuit 205 and the resulting sum is coupled to the input of a threshold circuit 206. If the sum exceeds the threshold level within circuit 206, an energizing signal is coupled to one input of an OR gate 208. The threshold level within circuit 206 is caused to be sufficiently high in magnitude such that spurious noise spikes on either one of the chrominance signals will not result in producing an energizing signal out of threshold circuit 206.

To detect the very small changes in chrominance signals which may be lower than the expected noise spike amplitudes, the difference values on lines 145 and 146 are also coupled to the inputs of circuits 202 and 204, respectively. Each of the circuits 202 and 204 adds together the absolute magnitude of several difference values at its respective input and develops this summation at its output. In the present embodiment, four difference values from lines 145 and 146 are added together in circuits 202 and 204, respectively. The absolute magnitudes of the summations developed by circuits 202 and 204 are coupled to the inputs of an adder circuit 207. The output of adder circuit 207 couples the resulting summation into a threshold circuit 209. As a result, the very small changes in the chrominance signals are detected by the operation of circuits 202, 204, 207 and 209 by setting the threshold level within threshold circuit 209 to a value which represents on a per picture element basis a lower level than the threshold level within circuit 206.

The energizing signal developed by threshold circuit 209 when the resulting summation at its input exceeds its threshold level is coupled to a second input of OR gate 208. As a result, an energizing signal from either threshold circuit 206 or threshold circuit 209 will cause an energizing signal to be produced on line 181 at the output of the chrominance decision circuit 180. To prevent the summations within circuits 202 and 204 from being carried over from one segment into the next segment of chrominance signal, the reset pulse available on line 128 is coupled to reset inputs of circuits 202 and 204. Energizing these reset inputs causes the summation within circuits 202 and 204 to be reset to zero.

Inasmuch as all of the chrominance values are not available to the receiving decoder, a circuit equivalent to the chrominance decision circuit is not possible in the receiving decoder. Hence, any chrominance changes which result in the production of an energizing signal on line 181 must in some way be addressed or located in order to permit the receiving decoder to insert properly the representative values corresponding to these changes into the video line. One possible solution to this problem is to provide an address generator whose digital words represent locations within a video line. The address word corresponding to a detected chrominance change may then be coupled along with the representative values for that chrominance change into the digital transmitter for transmission to the decoder. This approach, while workable, destroys the operating efficiency of the system inasmuch as the address bits must be added in order to locate those changes in chrominance values which do not occur during changes in the luminance signal. In accordance with the present invention, no address generator is necessary since the chrominance changes which occur in the absence of changes in the luminance signal are located within the video line by the decoder with the same apparatus which is utilized to detect a luminance change. In brief, a specially chosen artificially induced change is caused to occur in the luminance signal at the precise location at which the chrominance change is detected.

In FIG. 1, the output of the chrominance decision circuit 180 is coupled by way of line 181 to an input of an AND gate 182. Line 125 at the output of luminance decision circuit 120 is coupled to an inhibit input of this AND gate 182. Hence, when the chrominance decision circuit 180 produces an energizing signal on line 181 during an instant when no luminance change is detected by the luminance decision circuit 120, AND gate 182 produces an energizing signal at one input of a pulse insertion unit 190. The element-to-element difference on line 123 from luminance decision circuit 120 is provided to a second input of the pulse insertion unit 190. Finally, the clock pulses on line 118 are provided to a third input of the pulse insertion unit 190.

Figure 3:
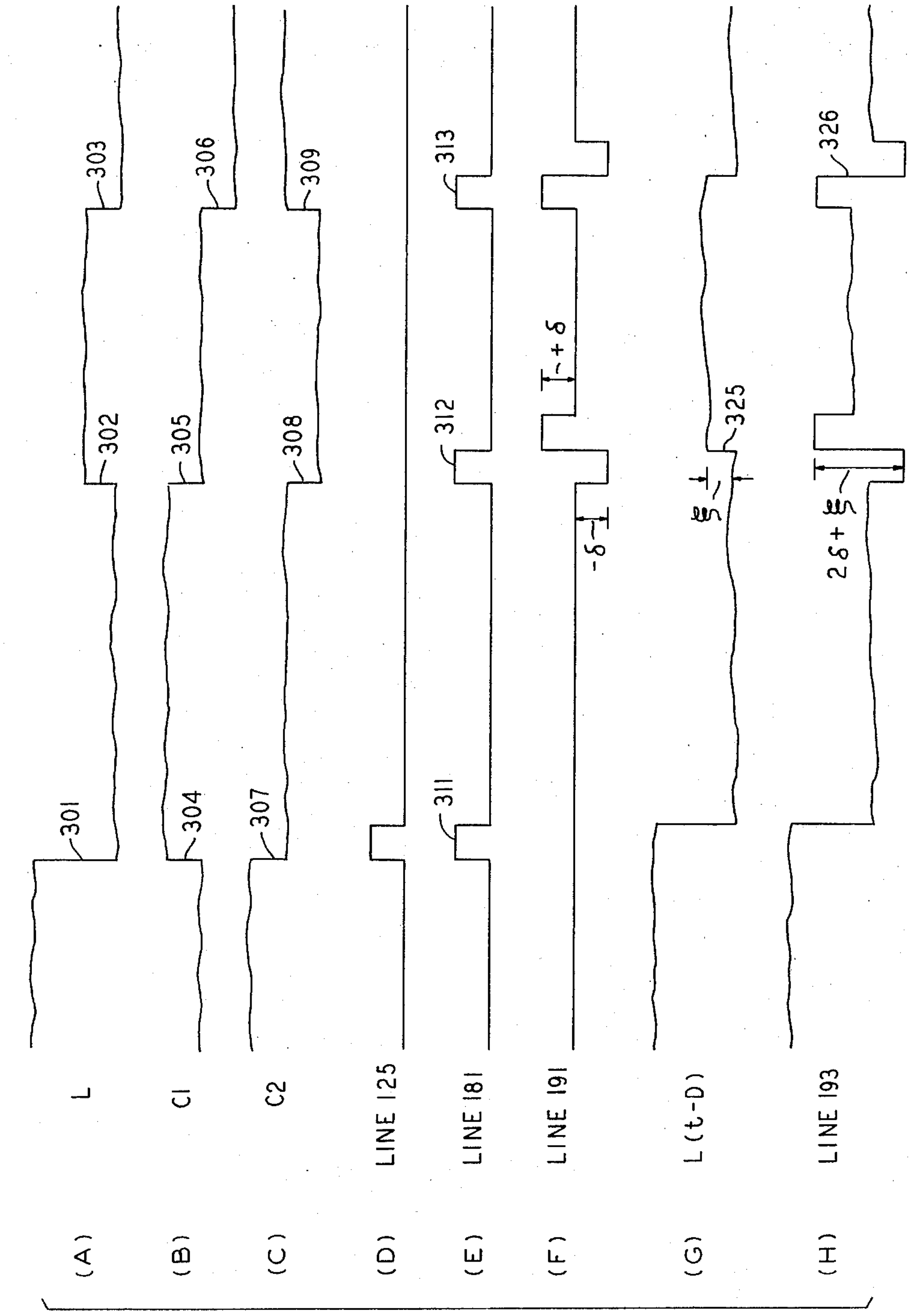
FIG. 3 is a family of waveforms useful in describing the operation of the present invention.

The operation of pulse insertion unit 190 can best be described by referring to the voltage versus time waveforms A through H of FIG. 3. Although the waveforms shown in FIG. 3 are illustrated in analog form for purposes of clarity, it is to be understood that in the present embodiment the signals represented by these waveforms are actually present in the embodiment in a digital form. Hence, the waveforms of FIG. 3 may be thought of as the analog representations for the amplitude values of the digital words present in the embodiment. Waveform A illustrates the luminance signal with luminance changes occurring at points 301, 302 and 303. The change at point 301 is large enough to exceed the threshold level within luminance decision circuit 120, whereas the changes at points 302 and 303 are not large enough to exceed this threshold level. Waveform B represents the chrominance signal C1 available at input terminal 101 with changes occurring at points 304, 305 and 306. Waveform C represents the chrominance signal C2 available at input terminal 102 with changes at points 307, 308 and 309. All of the changes in both waveforms B and C at points 304 through 309 are large enough to exceed the threshold level within threshold circuit 206 of the chrominance decision circuit 180.

The change at point 301 in the luminance signal of waveform A is shown to produce an energizing signal on line 125 at the output of luminance decision circuit 120 in waveform D of FIG. 3. Similarly, the above-mentioned changes in the chrominance signals are caused to produce energizing signals on line 181 as shown in waveform E of FIG. 3 by the pulses designated as 311, 312 and 313. The output from the pulse insertion unit 190 on line 191 is shown as waveform F in FIG. 3. As indicated hereinabove, when an energizing signal is produced by the chrominance decision circuit 180 during an instant when the luminance decision circuit 120 also produces an energizing pulse on line 125, AND gate 182 is inhibited and no energizing signal is therefore coupled from its output to the pulse insertion unit 190. Hence, during the changes 301, 304 and 307 in FIG. 3 no output is developed on line 191 at the output of the pulse insertion unit 190.

During the pulses 312 and 313 of waveform E which represent changes in the chrominance signal that are not accompanied by significant changes in the luminance signal, the pulse insertion unit 190 develops a waveform of the type shown in waveform F in FIG. 3. The waveform developed by the pulse insertion unit provides an increment of one polarity during a first picture element interval in response to a first clock pulse and an increment of the opposite polarity during a second picture element interval in response to the succeeding clock pulse. The sequence of the polarities is dependent on the type of change occurring in the luminance signal. If the luminance signal is undergoing a positive-going change, the first increment at the output of the pulse insertion unit is negative in polarity whereas a negative-going change in the luminance signal causes the first increment from the pulse insertion unit to be positive in polarity. The increments in potential developed by the pulse insertion unit are designated as $\pm\delta$ in waveform F of FIG. 3. The value of $\delta$ is chosen such that $2\delta$ is greater than the threshold level in the luminance decision circuit 120.

The luminance digital words available on bus 113 at the output of the analog-to-digital encoder 110 are delayed by one clock pulse interval, that is, by one picture element interval in a delay circuit 155. Digital words at the output of delay circuit 155 are coupled to one input of an adder circuit 192. A second input of adder circuit 192 is connected by way of bus 191 to the output of the pulse insertion unit 190. The delay of circuit 155 is necessary in order to permit the first increment produced by the pulse insertion unit 190 to be added (or subtracted if the polarity is negative) to the luminance value which precedes the change that has been detected by the chrominance decision circuit 180. As a result, the change of $2\delta$ caused by the addition of pulse insertion unit 190 in adder circuit 192 to the luminance values will occur at the precise interval during which the change has been detected in the chrominance decision circuit 180.

The analog equivalent of the digital word values available at the output of delay circuit 155 is illustrated as waveform G in FIG. 3. This waveform G is identical to waveform A except that it has been delayed by an interval equivalent to the interval between two clock pulses on line 118. This delay interval is represented in the waveforms by the letter D. The output from adder circuit 192 is illustrated in analog form by waveform H in FIG. 3. As expected, the change 301 in the luminance signal, although delayed by delay circuit 155, is unaffected by adder circuit 192 since the pulse insertion unit 190 produces no output during this change. During the chrominance changes that are not accompanied by significant luminance changes, however, the increments of potential produced by the pulse insertion unit 190 are added in adder circuit 192 to the luminance digital words, thereby causing an analog equivalent waveform of the type shown as waveform H in FIG. 3.

As indicated hereinabove, the polarity of the increment introduced by the pulse insertion unit 190 is based upon change in the luminance signal indicated on line 123 out of luminance decision circuit 120. By choosing a negative first increment in response to a positive-going change in the luminance signal and, vice versa, by choosing a positive first increment in response to a negative-going change in the luminance signal, the total change in luminance signal created at the output of adder circuit 192 will never be less in value that $2\delta$. Any change in the luminance signal simply adds to the total change induced by the output pulse insertion unit 190. As a result, this change introduced into the luminance signal by the pulse insertion unit will always be detectable by the apparatus in the decoder equivalent to the luminance decision circuit. In a situation where the chrominance signals encounter a change with no change occurring in the luminance signal, the polarity of the increment are, of course, unimportant and therefore either polarity of increment in this situation may occur before the other.

Apparatus utilized to implement pulse insertion unit 190 in the present embodiment is shown in FIG. 2. The output from AND gate 182 is coupled both to the input of a one-element delay line 231 and to one input of an AND gate 232. Hence, the first appearance of an energizing pulse from the output of AND gate 182 causes AND gate 232 to be energized. During the next clock pulse, this energizing pulse from the output of AND gate 182 emerges from the output of delay line 231 and energizes the inhibit input of AND gate 232. As a result, only a single pulse can appear at the output of AND gate 232 during two successive picture element intervals. The appearance of a second energizing pulse from the output of AND gate 182 during the second one of these two intervals will always be inhibited by the appearance of the first energizing pulse at the inhibit input of AND gate 232.

The energizing pulse from AND gate 232 is coupled both to one input of an OR gate 233 and to the input of another one-element delay line 234. During the succeeding picture element interval, the energizing pulse from AND gate 232 emerges from the output of delay line 234 and causes a second input of OR gate 233 to be energized. As a result, each appearance of a single energizing pulse from the output of AND gate 232 causes an energizing pulse to appear at the output of OR gate 233 during two consecutive picture element intervals. These two energizing pulses are coupled from the output of OR gate 233 to the control input of a word generator 235. In response to an energizing pulse at its control input, word generator 235 develops a 3-bit digital word at its output whose value is equal to the δ increment which is desired to be added and subtracted from the luminance digital words.

The energizing pulse from AND gate 232 is also coupled to one input of an AND gate 236 and also to one input of an exclusive OR gate 237. A second input of AND gate 236 is coupled to line 118 to receive the clock pulses from clock pulse generator 104. When an energizing pulse is present at the output of AND gate 232, AND gate 236 is energized by the clock pulse on line 118, thereby causing the control input of a sampling circuit 238 to be energized. Line 123, carrying the element-to-element difference present in the luminance decision circuit 120, is connected to the input of sampling circuit 238. In response to each energizing pulse at its control input, sampling circuit 238 develops and holds a digital one or digital zero at its output on line 239, the particular digital value chosen being dependent on the sign of the difference present on line 123. If the luminance difference on line 123 is positive in value, representing a positive-going change in luminance values, sampling circuit 238, in response to an energizing signal at its control input, provides a digital one on line 239. If, on the other hand, the sign of the change on line 123 is negative, representing a negative-going change in luminance values, sampling circuit 238 develops a digital zero on line 239.

As indicated hereinabove, each chrominance change represented by an energizing signal at the output of AND gate 182 causes an energizing pulse to appear at the output of AND gate 232 only during the first one of two successive picture element intervals. During the second picture element interval, a digital zero will always be present at the output of AND gate 232. As is well known to those skilled in the art, exclusive OR gate 237 provides a digital one at its output if the digital values present at its two inputs are dissimilar, whereas it provides a digital zero at its output when the digital values present at its two inputs are the same. Hence, if a positive-going change is detected by sampling circuit 238, the digital one present on line 239 combines with the digital one present at the output of AND gate 232 during the first one of two picture element intervals to produce a digital zero on line 240 at the output of exclusive OR gate 237. During the second one of the two picture element intervals, the digital zero at the output of AND gate 232 combines with the digital one held by sampling circuit 238 on line 239 to provide a digital one on line 240. If, on the other hand, a digital zero is sampled and held by circuit 238 on line 239, a digital one will appear on line 240 during the first one of two picture element intervals followed by a digital zero during the second one of the two picture element intervals. As indicated in FIG. 2, line 240 is combined on bus 191 with the three digital bits provided by word generator 235 in order to couple a 4-bit digital word to adder circuit 192 in which the digital bit present on line 240 represents the sign bit of the 4-bit digital word. In the present embodiment, a digital one on line 240 indicates to adder circuit 192 that the digital value provided by word generator 235 should be added to the luminance word provided at the output of delay line 155. A digital zero on line 240 causes adder circuit 192 to subtract the digital value represented by the word from word generator 235 from the luminance word.

The operation of the apparatus is illustrated in waveform H of FIG. 3 wherein the positive-going change 302 in waveform A causes aa value of δ to be subtracted from the luminance signal in waveform G at a point before the change 325 and causes a value of δ to be added to the luminance signal of waveform G at a point after the change 325. An analog representation of the digital values present at the output of adder circuit 192 on bus 193 is shown in waveform H of FIG. 3. The opposite action of addition followed by subtraction of the δ value is illustrated in waveform H at point 326. In either case, the modification of the change in luminance values introduced by the pulse insertion unit 190 is never diminished by any change that may occur in the luminance signal. As a result, the change of at least 2δ will always be available to the receiving decoder for the purpose of locating the chrominance values which are inserted into the buffer memory as a result of an output from chrominance decision circuit 180 during the interval when no significant luminance change has occured.

As indicated hereinabove, a luminance signal at input terminal 100 in FIG. 1 is coupled to the input of a horizontal sync stripper 103. In response to the horizontal blanking intervals within the luminance signal at terminal 100, horizontal sync stripper 103 develops an energizing pulse at its output on line 107. This energing pulse on line 107 causes a blanking interval pulse generator 108 to develop an energizing signal on line 109 during the horizontal blanking interval. This energizing pulse on line 109 is coupled through a delay line 153 to the control input of a switching circuit 115 and also to an input of a digital transmitter 160. Delay line 153 provides a delay equal in value to the interval between adjacent clock pulses on line 118. This delay is provided to compensate for an identical delay introduced by the delay line 155 discussed hereinabove. Switching circuit 115, although shown in the drawings symbolically as a single-pole double-throw switch, is actually a plurality of logic AND gates which may be energized or inhibited, depending on the state of the signal present on line 154, the output of delay line 153. With no energizing signal on line 154, the digital words on bus 113 representing the luminance information are coupled through switching circuit 115 to the input of digital transmitter 160. This digital transmitter 160 in turn couples these digital words presented at its input to a transmission channel 170. During the horizontal blanking interval when an energizing pulse is provided on line 109, the input of digital transmitter 160 is decoupled in switching circuit 115 from bus 113 and is instead coupled by way of switching circuit 115 to the output of the auxiliary buffer memory 150. In response to the energizing pulse on line 154, digital transmitter 160 couples read-out pulses to the read input of buffer memory 150, thereby causing this buffer memory to be emptied of all of its information during the horizontal blanking interval. Inasmuch as this type of operation causes information to be provided at the input of digital transmitter 160 at a variable rate, digital transmitter 160, in a manner well known to those skilled in the art, must utilize a buffer memory at its input to interface the variable-rate-generated information with the constant bit-rate of transmission channel 170. To synchronize both the encoder in FIG. 1 with a receiving decoder, the digital bits generated at transmission channel 170 are caused to occur at a rate which is related to the rate at which pulses are generated by clock generator 104.

In summary, the digital encoder in FIG. 1 transmits chrominance information when a change occurs either in the luminance signal or in one or both of the chrominance signals, and when the selected chrominance information is not accompanied with a significant luminance change, the luminance signal is modified by a selected waveform so as to produce a significant change. Although the specific embodiment which has been described stores the chrominance information during the active region of the video line and transmits this information during the horizontal blanking interval, it will be appreciated by those skilled in the art that chrominance information can also be transmitted by interleaving the chrominance information with the luminance information during the active region of the video line. This latter type operation may require distinctive code words to identify the chrominance information but the reduction in the number of digital bits which must be transmitted for the chrominance information will still yield an increased efficiency in operation. In the embodiment shown, digital transmitter 160 distinguishes the luminance information from the chrominance information by transmitting a single distinguishable code word at the beginning of each active region of a video line. After 256 luminance digital words, a variable number of chrominance words are presented in transmission channel 170.

The digital bits developed on transmission channel 170 are connected to the input of a digital receiver identical to the one shown in the above-mentioned copending application by J.O. Limb and C.B. Rubinstein. Briefly, the receiving decoder separates the luminance and chrominance digital words into separate memories and changes the value of each chrominance signal during each instant that a significant change is detected in the luminance values.

What has been described hereinabove is a specific embodiment which utilizes and practices the present invention. Numerous modifications may be made by those skilled in the art without departing from the spirit and scope of the present invention. For example, any one of several monochrome decoders well known to those skilled in the art may be connected in the encoder to process the luminance values before they are transmitted over transmission channel 170. For example, a DPCM (differential pulse code modulation) encoder may be inserted between analog-to-digital converter 110 and the input of switching circuit 115. Since the output of this type encoder provides digital words whose values represent element-to-element differences, the output of this encoder may be directly connected to the input of a threshold circuit identical in function to that of symmetrical threshold circuit 124. The outputs of the DPCM encoder are then checked by this threshold circuit against a predetermined threshold level to develop the energizing signal which indicates when chrominance information must be transmitted to the receiving location. The utilizations of other prior art encoders may be adapted to further process either the luminance signal or the chrominance signals.

We claim:

1. Apparatus for encoding at least one chrominance signal which provides color information for a scene represented by a luminance signal, said apparatus comprising means responsive to said chrominance signal for developing a value which represents the chrominance signal, means responsive to said luminance signal for developing a first energizing signal in response to a significant change in said luminance signal, means responsive to said chrominance signal and to said value representing said chrominance signal for developing second energizing signal, means responsive to the presence of either said first or said second energizing signals for coupling said value representing the chrominance signal to a transmission channel, and means responsive to the presence of said second energizing signal and the absence of said first energizing signal for changing said luminance signal before said luminance signal is coupled to the transmission channel.

2. Apparatus as defined in claim 1 wherein said means for developing a second energizing signal includes at least one subtractor circuit having one input connected to receive said chrominance signal and a second input connected to receive said value representing said chrominance signal, and a threshold means for developing an energizing signal in response to an output from said subtractor circuit which exceeds a predetermined threshold level.

3. Apparatus as defined in claim 2 wherein said means for developing a second energizing signal further includes means for developing a summation of a plurality of outputs from said subtractor circuit, and a second threshold means for developing an energizing signal when the summation of a plurality of outputs from the subtractor circuit exceeds a second predetermined threshold level.

4. Apparatus as defined in claim 1 wherein said means for changing said luminance signal includes means for delaying said luminance signal, and means for changing the magnitude of the delayed luminance signal by a first increment of one polarity and then by a second increment of the other polarity in response to the presence of said second energizing signal and the absence of said first energizing signal.

5. Apparatus as defined in claim 4 wherein said means for changing said luminance signal further includes means responsive to changes in said luminance signal for selecting the polarity of the first increment of change in the delayed luminance signal.

6. Apparatus as defined in claim 1 wherein said means for changing said luminance signal includes a means responsive to changes in said luminance signal for determining the polarity of changes induced into said luminance signal.

7. A video encoder for use with a luminance signal and at least one chrominance signal comprising means for developing luminance samples in response to said luminance signal, means for developing chrominance samples in response to said chrominance signal, color processing means having a signal input, an output and a control input, means for coupling said chrominance samples to said signal input, means responsive to said luminance samples for developing a first energizing signal, means for developing a second energizing signal in response to a significant difference between at least one of said chrominance samples and to the output of said color processing means, means for coupling either said first or said second energizing signals to the control input of said color processing means, and means for modifying the amplitudes of said luminance samples in response to the presence of said second energizing signal when said first energizing signal is absent.

8. A video encoder as defined in claim 7 wherein said means for developing a second energizing signal includes a subtractor circuit having one input connected to receive said chrominance samples and a second input connected to receive the output of said color processing means, and a threshold means for developing an energizing signal when the absolute magnitude of the output of said subtractor circuit exceeds a predetermined level.

9. A video encoder as defined in claim 8 wherein said means for developing a second energizing signal further includes means for developing a summation of a plurality of outputs from said subtractor circuit, and a second threshold means for developing an energizing signal when the summation of a plurality of outputs from said subtractor circuit exceeds a second predetermined level.

10. A video encoder as defined in claim 7 wherein said means for modifying the amplitudes of said luminance samples includes means for delaying said luminance samples, and means for adding a first increment of one polarity to a delayed luminance sample followed by adding a second increment of the opposite polarity to a second delayed luminance sample.

11. A video encoder as defined in claim 10 wherein said means for modifying the amplitudes of said luminance samples includes means responsive to a change in amplitude of said luminance samples for determining the polarities of said first and second increments.

12. The method of processing a chrominance signal which represents color information in a scene corresponding to a luminance signal comprising the steps of developing a representative value for said chrominance signal during a selected interval, terminating said selected interval in response to either a significant change in the luminance signal or a significant difference said chrominance signal and said representative value, coupling said representative value to a transmission channel when said selected interval is terminated, and addressing for transmission a representative value representing an interval which has been terminated in the absence of a significant difference in the luminance signal by developing a change in the luminance signal prior to its transmission.

13. The method of processing a chrominance signal as defined in claim 12 wherein the step of addressing includes the step of changing the magnitude of the luminance signal by a first increment of one polarity and then by a second increment of the other polarity.

* * * * *